Figure 15:
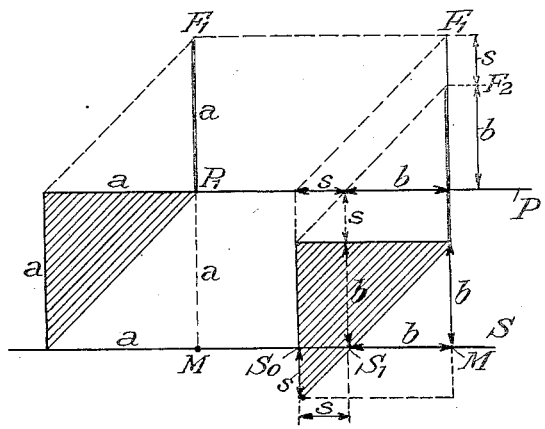

Aug. 6, 1935.  E. MATTHIAS  2,010,407
DEVICE FOR THE PLANAR REPRODUCTION OF SURFACE
FORMATIONS SUCH AS THE SOLES OF HUMAN FEET
Filed Jan. 9, 1934  4 Sheets-Sheet 1
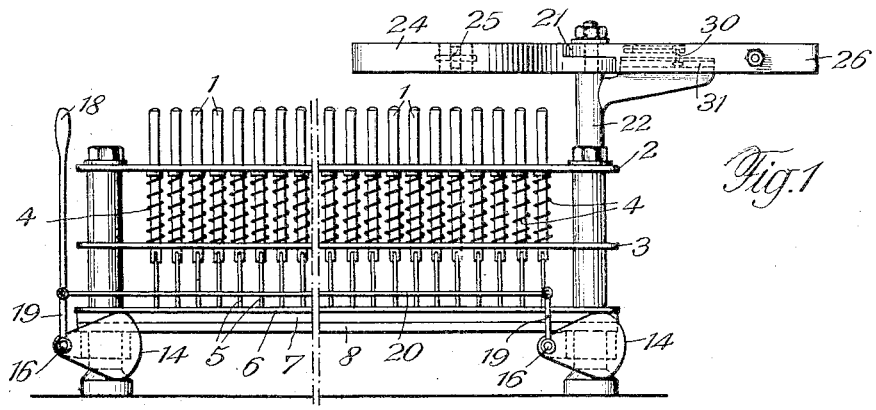
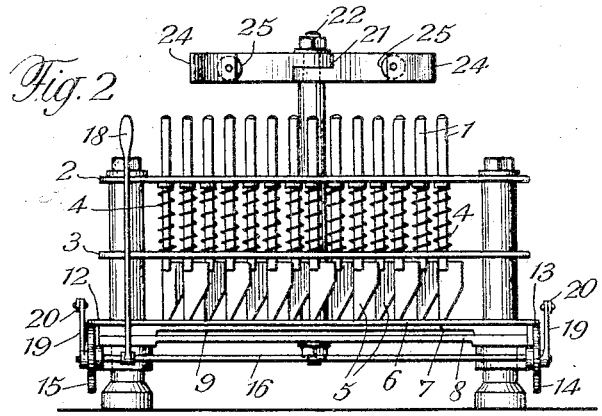
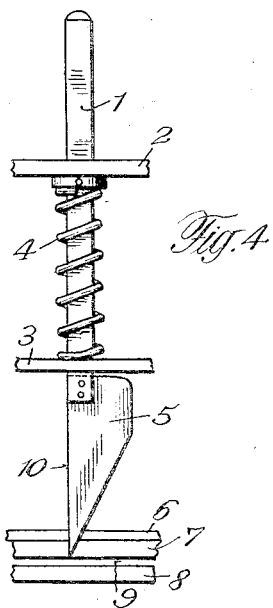
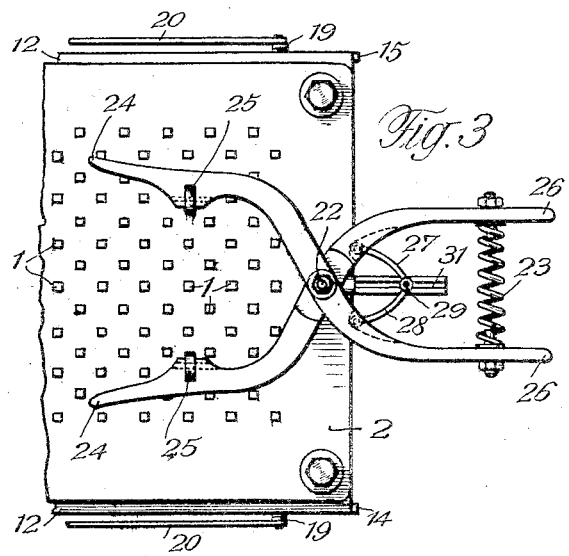
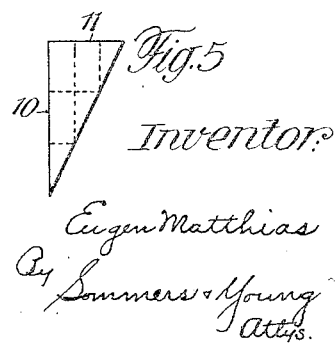
Inventor:
Eugen Matthias
By Sommers & Young
Attys.

Aug. 6, 1935.  E. MATTHIAS  2,010,407
DEVICE FOR THE PLANAR REPRODUCTION OF SURFACE
FORMATIONS SUCH AS THE SOLES OF HUMAN FEET
Filed Jan. 9, 1934   4 Sheets-Sheet 2
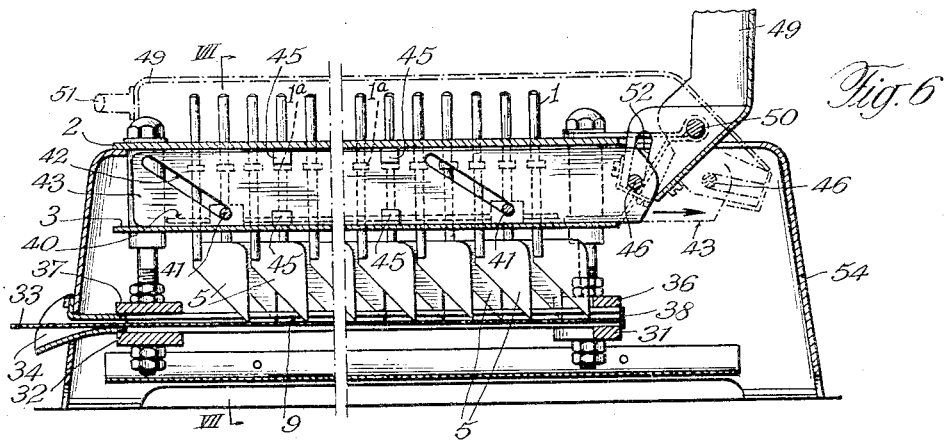
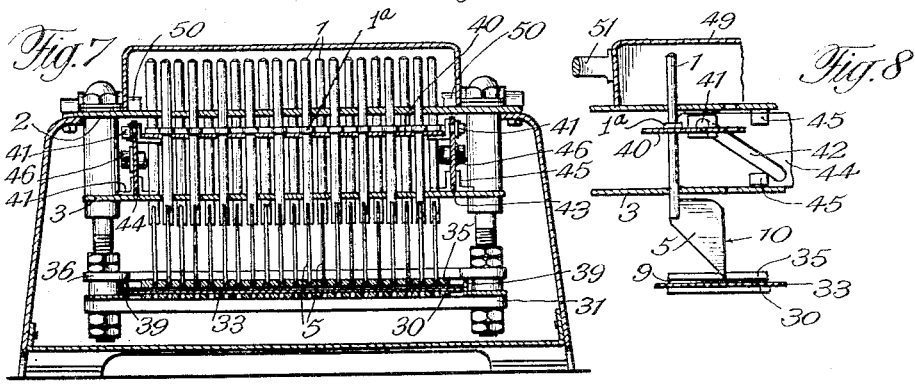
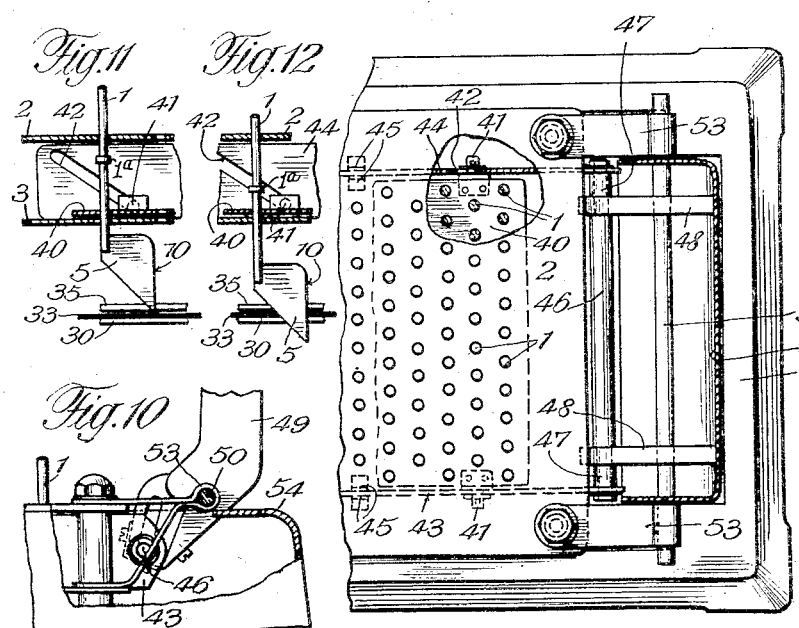

Aug. 6, 1935.  E. MATTHIAS  2,010,407
DEVICE FOR THE PLANAR REPRODUCTION OF SURFACE
FORMATIONS SUCH AS THE SOLES OF HUMAN FEET
Filed Jan. 9, 1934  4 Sheets-Sheet 3
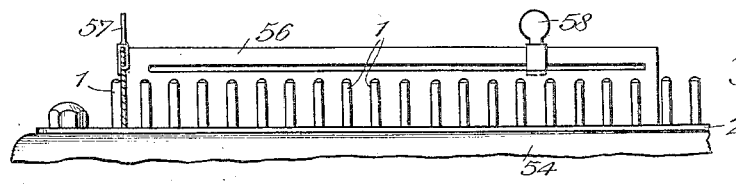
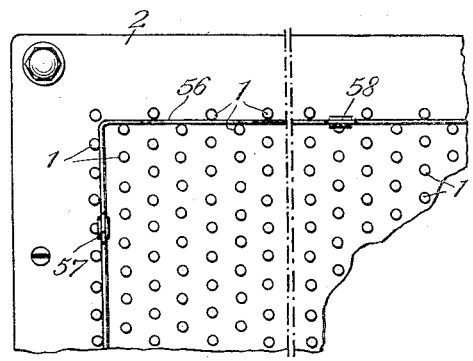
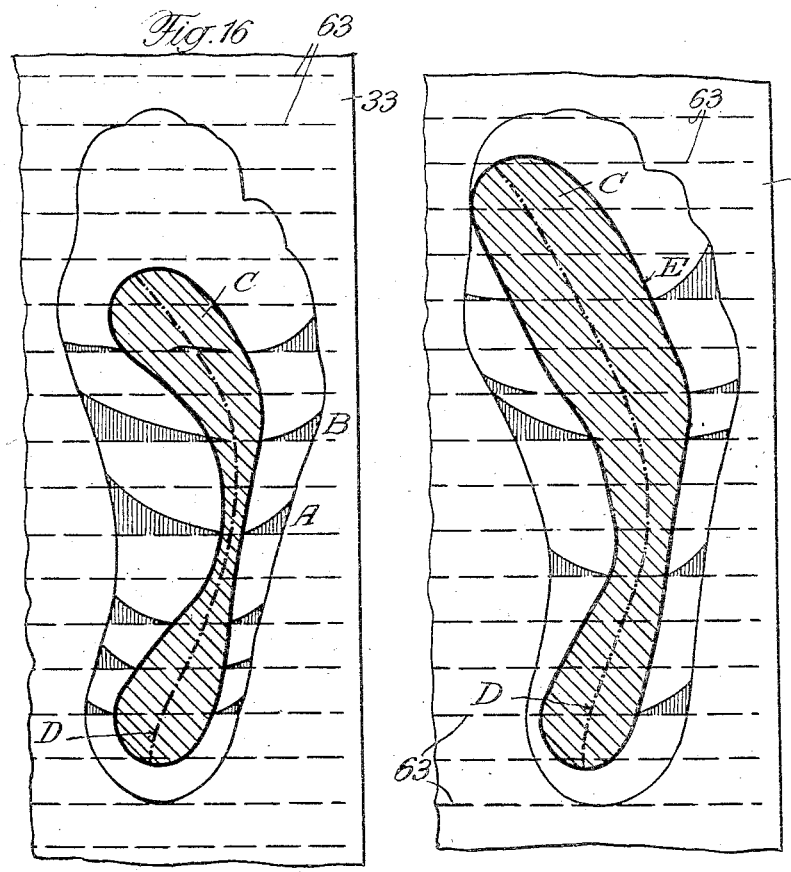

Patented Aug. 6, 1935

2,010,407

UNITED STATES PATENT OFFICE 2,010,407

DEVICE FOR THE PLANAR REPRODUCTION OF SURFACE FORMATIONS SUCH AS THE SOLES OF HUMAN FEET

Eugen Matthias, St. Moritz, Switzerland

Application January 9, 1934, Serial No. 705,922
In Germany July 14, 1933

11 Claims. (Cl. 33—175)

This invention relates to devices for the planar reproduction of surface formations such as the soles of human feet.

With a view to devising means for remedying or at least alleviating the diverse frequent foot diseases, as far as deviations from the normal shape of the foot are concerned, it is in the first place necessary to be enabled to ascertain precisely the nature of the foot disease. This involves the problem of determining the distances between a multiplicity of points of the surface of the foot in the horizontal as well as in the vertical direction in an accurate manner in order to permit of recognizing in which respect the formation of the foot deviates from the normal shape. On these data the steps to be taken for remedying or alleviating the disease are depending, i. e. whether a foot arch or bandaging of the foot or an orthopedic shoe or else therapeutic treating of the foot is to be resorted to. Furthermore, it is questionable whether a reproduction of the shape of the foot should be made in the loaded or non-loaded, i. e. the relieved condition of the foot.

Hitherto, the following two methods were generally applied, as making

1. An imprint of the foot by means of a thin sheet of rubber,
2. A plaster-cast.

The imprint is usually made in a one-sidedly loaded condition of the foot, whereas the plaster-cast is made while the foot is either fully loaded or not loaded at all.

For a proper judgment of the pathologic condition of the foot, it is of vital importance that aside from determining the deformation of the foot also the degree to which the capability of functioning of the foot is impaired is ascertained, in order to be able to decide on the mode of remedying or therapeutic treating to be applied with the most prospects of success. To this end, it is essential that the relative disposition and difference in height of certain points of the foot are determined in the relieved and loaded state of the foot.

The method of making an imprint referred to above has the considerable disadvantage that by means of it only those joints of the foot are recorded which in applying the foot onto the supporting surface contact with the latter, whereas all other points are not considered though the measuring of the distances between these points and the supporting surface is of decisive significance for the determination of the form of the foot. But also those points of which a record is obtained with the aid of an imprinting method are actually of entirely different relative positions as regards height. The lowermost points which during any natural method of making an imprint of the foot have, in the applied position of the foot, the tendency to assume a still lower level, are held back by the unyielding supporting surface, whereas the upper points come to lie in one and the same plane. Thus it is impossible to measure the difference in height actually existing between the various points by means of this method.

Moreover, with this method, the thickness to which the supporting surface is coated is of eminent importance, as different thicknesses of coating produce entirely different imprints, so that it is impossible to determine measurable differences between the forms of the foot in the relieved and loaded state thereof, by means of this method. Consequently this method of taking imprints is entirely too crude for determining the actual form of a foot, as too many arbitrary assumptions must be made in connection therewith.

The method of making a plaster-cast renders substantially more exact results, but it has the drawback of being complicated and correspondingly expensive and that it can be carried out properly only by an experienced professional, because if not carried out with expert skill or in the event that the patient should move the foot considerable errors are apt to arise. Further drawbacks are encountered, when the plaster-casts must be transported which is very often the case.

The plaster-cast can be carried out in the relieved or loaded condition of the foot, but this is practically of little advantage, as there exists no possibility of determining the differences in height existing for the various important points of the plaster-casts.

The object of the present invention is to eliminate the drawbacks referred to. This is accomplished, according to the invention, by providing a device for effecting planar reproductions of surface formations, particularly, of human feet, which comprises a multiplicity of relatively parallelly displaceable feeler pins having unsymmetrical, wedge-shaped flat knives, which by displacing the feeler pins in accordance with the surface to be tested, are caused to cut in a sheetlike stamping support laid on a matrix table, and being positively restored from their cutting positions by a common resetting means.

This device permits of reliably recording in a perfect manner points, for example of a foot, on stamping sheets as regards their relative dispositions in space and their differences in height in the relieved and loaded conditions of the foot. The position and the length of the incisions, i. e. lengths produced on the stamping sheets, with the aid of which the difference in height of the recorded points can be measured, define the formation of the surfaces to be tested by feeler means in a clear manner, as will be readily understood. The operation of the device is very simple and the stamping sheets representing imprintings of the feet can be distributed for utilization to trade specialists, for example orthopedic shoe makers, shoe trading concerns, concerns trading in sanitary articles, orthopedists or the like.

Figure 18:
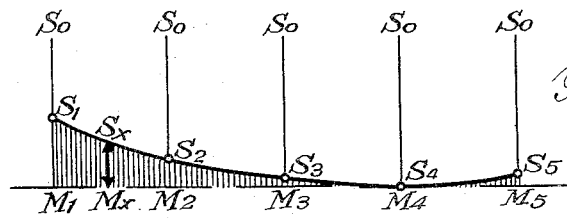
Figure 19:
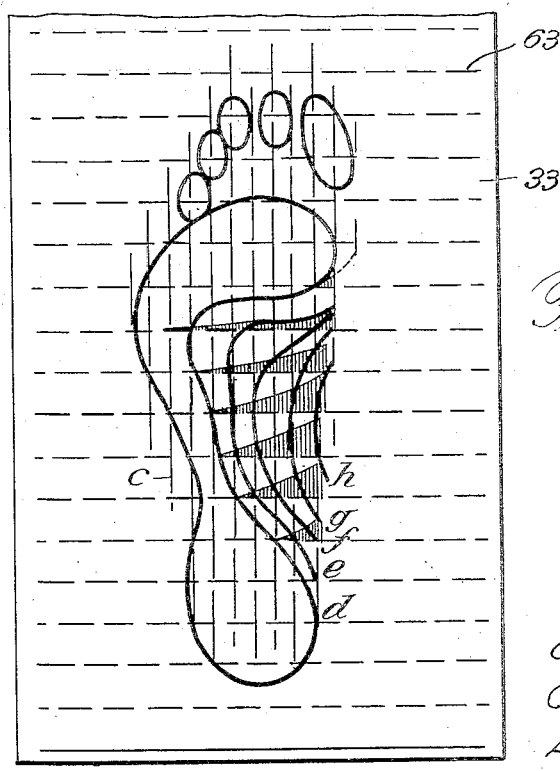

In the accompanying drawings constructional forms of the invention are illustrated by way of example only, in which Fig. 1 shows a side elevation of a first constructional form, Fig. 2 shows a front view thereof, Fig. 3 shows a partial plan of Fig. 1, Fig. 4 is a view of a feeler pin inclusive of a knife on a larger scale, Fig. 5 represents a diagram for explaining the cutting effect, Fig. 6 shows a longitudinal section of a second constructional form, Fig. 7 shows a cross section on the line VII—VII in Fig. 6, Fig. 8 shows a fragmentary sectional side elevation of Fig. 7, Fig. 9 shows a fragmentary sectional plan of Fig. 6, Fig. 10 shows a fragmentary sectional elevation of Fig. 6, Figs. 11 and 12 represent two sectional elevational views for illustrating the manner of operation of the knives, Figs. 13 and 14 are elevational and plan views respectively for illustrating an additional auxiliary member, Fig. 15 is a schematical illustration of the operation of the knives, Figs. 16 and 17 represent two views of stamping sheets with reproductions of feet made thereon with the aid of the device according to the invention, and the Figs. 18 and 19 are schematic views for explaining the manner in which the incisions cut in the stamping sheet by means of the knives are utilized for practical purposes.

Referring to the first constructional form of the invention shown in the Figs. 1 to 4 of the drawings, the numeral 1 designates a multiplicity of upstanding feeler pins which are arranged on two superposed horizontal plates 2 and 3 which are guided to be longitudinally displaceable. These feeler pins are forced upwardly by helical springs 4 in such manner that they bear against the underside of the plate 2 by means of an abutment, so that the heads of the pins are situated in a common plane above the plate 2. On the lower ends of the pins 1, wedge-shaped parallelly extending flat knives 5 are connected which are adapted for protruding through three slotted horizontal plates 6, 7 and 8. Between the plates 7 and 8, a narrow slot 9 is provided for inserting a sheet-like stamping support for which the plate 8 serves as a matrix plate and which is severed at certain parts by the downwardly moving knives.

When, by way of example, it is desired to reproduce, i. e. record the shape of the surface of a foot, while the latter is loaded by the weight of the body, on the stamping sheet, the person whose foot is to be tested by the feeler means referred to above sets his foot on top of the complement of feeler pins 1. Consequently the feeler pins contacted are depressed in their guides in accordance with the sole of the foot, while the springs 4 are compressed, so that the knives 5 correspondingly penetrate the stamping sheet, inserted in the slot 9, more or less, thus slitting this sheet proportionately.

In order to provide for the incisions as cut in the stamping sheet by the knives to refer all to the same zero datum plane, for rendering possible to apply the records thus obtained to practice, the flat knives are in the form of unsymmetrical wedges that are so arranged that the cutting edge 10 of each knife extends parallel to the vertical path of movement of the point thereof (Figs. 4, 5). By this means, the incisions cut in the stamping sheet are all equivalent to rectilinear stretches which are directly proportional to the travel of the knives and thus equivalent to the heights of the individual points of the surface tested by the feeler means, for example the sole of a foot.

If the effective surface of each knife is a rectangular triangle the vertical cutting edge 10 of which is of a length of three centimeters and the horizontal side 11 equal to 1.5 centimeters, the simple relation ensues that a theoretical cut or line of zero length in the stamping sheet or in a corresponding diagram blank respectively indicates that the respective test point is situated three centimeters above the datum plane established by the heads of the feeler pins 1 in their initial position. A cut of a length of ½ centimeter indicates that the respective test point is situated two centimeters above the datum plane for the feeler pin heads, whereas a cut of a length of one centimeter indicates that the respective test point lies one centimeter above this datum plane. The diagram blank may be initially ruled such divisions apart that the heights of the points of the test surface can be read off without any calculating commensurate with the lengths of the incisions, whereby the utilization of the diagrams for practical purposes, for example for the manufacture of foot arches, is considerably facilitated. For providing an accurately parallel guidance for all the knives, the feeler pins 1 and the guide apertures thereof in the plates 2 and 3 are made of square or prismatic shape, with a view to preventing distortion of the knives 5.

The knives are formed of thin flexible material and it sometimes occurs in operating with heavy stamping sheets that the blades are flexed out of position and bind against the sides of the slots of the plate 6, and do not return to their upper positions.

In order to ensure that the feeler pins 1 together with the knives 5 are reliably restored after each application of the device from their operative positions into inoperative position, a common resetting mechanism is provided for the knives 5, which comprises the plate 6, which is slotted in registry with the rows of knives. This plate 6 is guided by four corner posts interengaging with the plates 2, 3, 7 and 8, for firmly maintaining the same in registry, and bears normally on the plate 7 with its lateral marginal portions projecting beyond the longitudinal sides of the latter plate. Underneath these two projecting marginal portions 12 and 13 of the plate 6, two pairs of cam discs 14 and 15 respectively are arranged. These two pairs of cam discs are carried by two shafts 16 which are coupled to each other by arms 19 and links 20. By correspondingly rocking a hand lever 18 fixed to one of the shafts 16, the plate 6 shifts upwardly by action of the pairs of cam discs 14 and 15. By virtue of this movement any knives 5 that may still be at their lower positions, due to possible jamming against the sides of the slots of plate 6, are caused to share in this upward movement, thus being released from their incisions in the record sheet and from engagement with plate 6, are restored to their inoperative positions by action of the springs 4, so that in this way all the feeler pins 1 are reset into inoperative position, for putting the device in condition for renewed application. On rocking the hand lever 18 in the opposite direction, the plate 6 slides back into initial position automatically.

With a view to ensuring that during a repeated recording of the same test surface the latter readily assumes every time the same relative position to the knives, an auxiliary contrivance is provided above the feeler pins, as will be seen in the Figs. 1 to 3. This contrivance acts in the manner of an arresting device by means of which it is possible to set one and the same foot at all times into the same relative position to the feeler pins 1 and thus to the knives 5, so that all the stamping records obtained from this foot are perfectly identical.

This auxiliary contrivance comprises a pair of pincers 21 the jaws of which are adapted to be spread apart about a fixed upstanding pivot pin 22 against the action of a spring 23. On the inner sides of the jaws 24 of the pincers between which the foot is received, guide rollers 25 are arranged which render possible and facilitate, at the same time vertical movements of the foot relatively to the pincers 21. In order to prevent rotational displacements of the pincers 21 relatively to the pivot 22 thereof, the gripping portions of the pincers are provided with links 27, 28 the other ends 29 of which are commonly engaged by a pin 30 which is adapted to slide in a fixed slotted guide 31. By this means, the plane of symmetry of the pincers 21 maintains during each spreading movement of the jaws 24 the same relative positions to the knives 5, as will be readily understood.

In the second constructional form of the invention as per the Figs. 6 and 7, the matrix table is provided with a series of individual aligned bars 30 which are connected at their ends to lower supporting rails 31, 32, in such manner, that between each two bars 30 a gap for the passage of a correlated row of knives 5 is provided. On the thusly constructed matrix table, a stamping sheet 33 is placed by inserting said sheet through an entrance mouth-piece 34 and pushing it into the slot 9 which is formed by means of an additional upper series of aligned bars 35 which are arranged in spaced relationship similarly as the bars 30 on upper supporting rails 36, 37 so as to provide access for the rows of knives. At the rear, the slot 9 is limited by a strip 38 (Fig. 6) which serves as a stop for the stamping sheet 33, while two lateral strips 39 (Fig. 7) serve as guides for the stamping sheet during insertion and also during removal of the sheet 33 after the stamping operation.

The feeler pins provided with the knives 5 are again longitudinally displaceable transversely through the plates 2 and 3. Between these two plate 2, 3 a horizontally extending perforated auxiliary plate 40 is positioned. The feeler pins 1 protrude through the perforations of plate 40. This plate has the office to restore the feeler pins, which in this embodiment of the invention are not loaded by springs, and thereby the knives 5 compulsorily into initial, that is, inoperative position after each stamping operation. To this end the auxiliary plate 40 is provided at both longitudinal sides with two guide studs 41 which engage in guide slots 42 formed in web-shaped rails 43 and 44 respectively.

The two rails 43, 44 in turn are guided between angle pieces 45 connected to the fixed plates 2 and 3. At their rear ends, the two rails 43 and 44 are interconnected by a bolt 46, for uniting these rails into an individual sliding member. The bolt 46, which at its offset ends carries spacing sleeves 47 Fig. 9 is arranged on two arms 48 which belong to a lid 49 and are mounted conjointly on a shaft 50. This shaft serves as a pivot for the lid 49 which carries at its front end a handle 51. The connecting bolt 46 is inserted into slots 52 of the arms 48 (Fig. 6) so that in rotationally displacing the lid 49 a relative movement between the slots 52 and the bolt 46 takes place and the rails 43 and 44 are displaced. The pivot 50 of the lid 49 is mounted in holders 53 which are fastened to the stationary part of the contrivance that comprises a casing 54.

When the lid 49 is turned down, for covering the free ends of the feeler pins 1, from its open position as shown in full lines in Fig. 6 into the chain dotted position, and thus is closed, the rails 43 and 44 are displaced in the direction indicated in this figure by an arrow. Incidentally thereto, the studs 41 climb up in the guide slots 42 of the rails 43 and 44, while the auxiliary plate 40 is correspondingly raised. Consequently the feeler pins 1, resting with their abutments 1a on the upper side of the auxiliary plate 40, are also raised for being reset into inoperative position in which the knives 5 clear the slot 9 completely. Thereafter the stamping sheet 33 is inserted in the slot 9 and then the lid 51 is opened. At the same time the rails 43 and 44 are longitudinally displaced in the opposite direction to the prior shifting movement, whereby the auxiliary plate 40 is correspondingly lowered. Accordingly, the feeler pins 1 are released by the auxiliary plate 40 to be permitted to set with their knives on the stamping support 33, as evident from Fig. 11. On loading the feeler pins 1, for example by applying a foot thereon, the knives 5 are caused in a similar manner as described in connection with the first embodiment to cut in the stamping sheet 33 (Fig. 12).

In the second embodiment, the two cutting edges of the knives 5 form together an angle of 45°, the individual knife thus representing an equilateral rectangular triangle. This construction has the advantage that the incisions effected in the stamping sheet 33 by these knives, the cutting edge 10 of which is parallel to the vertical path of movement of the points thereof correspond in length exactly to the extent of the vertical displacements carried out by the respective knives. Thus, it will be seen that the punched stamping sheet enables directly reading off the differences in height of the respective points of the tested surface between the plane in which the heads of the feeler pins 1 are initially situated, thus doing away with any calculating operation.

The determination of these differences, according to the invention, is hereinafter more explicitly explained by taking reference to the sketch shown in Fig. 15 wherein the left hand hatched rectangular triangle with the two sides $a$ of equal lengths represents a knife in the inoperative position of the same. For simplifying the explanation, it is assumed that the stretch $F_1$—$P_1$ representing the length of a feeler pin corresponds to the length of a side $a$. M signifies the vertical projection of a feeler pin on the stamping sheet. The like triangle shown to the right in Fig. 15 illustrates the knife in position of cutting. In connection with this side, it is assumed that the test point $F_1$ of the foot has been depressed, by applying the foot to the position indicated by the point $F_2$. Accordingly, the feeler pin and the knife have been lowered by the stretch $s$ relatively to the lines $F_1$—$F_1$ and P and S respectively, the latter indicating the stamping sheet and showing it to be pierced to the depth $s$. The stretch $S_0$—$S_1$ cut in the stamping sheet by the knife corresponds to the stretch $s$ previously referred to, whereas the stretches $b$ indicate the resulting distance between the depressed point of the foot with respect to the line P.

The distance between the point M, which point can be established on the stamping sheet from the start, and the adjacent end of the cut thus corresponds to the actual height of the respective point of the foot. Consequently, the heights of the various tested points can be read on the stamping sheet directly.

On the termination of a test record, the lid 49 is turned down into closing position by means of which the feeler pins 1 are positively moved upwardly into inoperative position by the auxiliary plate 40, in the manner previously described. As in depressing the feeler pins 1 no spring action, but merely the slight resistance exerted by the stamping sheet of the thickness of a paper, is to be counteracted, the records obtained on the stamping sheets are correspondingly precise. In the inoperative position of the feeler pins 1, the knives 5 extend with their points into the gaps formed between the bars 35 which act as guide surfaces for the feeler pins 1 of round cross section during the displacements of the same.

As will be seen in the Figs. 13 and 14, an angular stop strip 56 is loosely arranged within the complement of feeler pins 1, so that the two arms of this strip each rest against correlated rows of feeler pins. The arms of this angular stop 56 are each provided with indexes 57 and 58 respectively extending into longitudinal grooves of these arms. This angular stop 56 can be used for determining the disposition of the foot within the complement of feeler pins, in such manner, that with the aid of the displaceable indexes 57 and 58 the rear point and a lateral point of contact between the foot and the stop 56 can be ascertained. By this means, it is possible to set one and the same foot any number of times into the same relative position to the complement of feeler pins which contributes to simplifying the comparison of records obtained on different stamping sheets by cutting into the same with the aid of the knives 5 or of tracings made from these stamped records.

The foot records drawn on the stamping sheets 33 shown in the Figs. 16 and 17 are obtained from the same foot, the record as per Fig. 16 relating to the foot in relieved condition and the record illustrated in Fig. 17 relating to the foot in loaded condition. For obtaining a record of the foot in the relieved condition thereof on the stamping sheet, the patient sits for example on a chair so as to be enabled to apply the foot onto the feeler pins in the manner described above. The stamping sheet 33 is provided with a division indicated by dash lines 63, the centers of the dashes of these lines corresponding as regards number and relative spacings, in the inserted position of the stamping sheet, exactly to the overlying feeler pins and thus to the test points of the foot as well as to the rows of knives 5 present in the casing 54 and extending transversely to the said lines. The centres of these dashes thus represent the points M shown in Fig. 15, for reading the heights of the test points.

In the Figs. 16 and 17, for the sake of clearness, no incisions from the knives are indicated and the transversely extending curves derived for these division lines 63 from these incisions are not all shown. These curves, which together with the division lines 63 and the contour of the foot enclose the hatched areas, change their shape considerably from division line to division line. In the Fig. 16, which is a record of a foot in relieved condition, between the hatched areas A and B a tendency of the maximum inclination to change over from the inner to the outer side of the foot is discernible. The obliquely hatched central surface C indicates the portion of the sole which actually contacts with the floor in applying the foot gently thereto. The dotted median line D of this central surface represents the joining line of the inner points of sagging of the sole, thus indicating the actual axis of the foot.

The Fig. 17 records the loaded foot to sag at the same part thereof in still more pronounced manner; characteristic for this foot is the lateral inclination of the sole at E. The record is that of a foot having spread as caused by principally straining the foot tangentially, for example in playing tennis, by frequently walking back and forth.

An example of plotting the heights of the tested points of the foot is illustrated in Fig. 18 wherein the points $M_1$ to $M_5$ correspond to the previously explained middle points M of the dashes of the division lines of the stamping sheet, and thus to the vertical projections of the feeler pins. The points $S_1$ to $S_5$ correspond to the respective ends of five cuts from the knives. The stretch $M_1$—$S_1$ indicates the actual height of the point tested above $M_1$; the difference $S_0$ to $S_1$ represents the actual depression of the feeler pin. In this way practically all the points transversely of the foot, that is, the points of its width from $M_1$ to $M_5$ are determined. Thus, if it is desired to ascertain the height of an intermediate point, for example point $x$, the points $S_1$ to $S_4$ are joined by a continuous line and the ordinate is drawn in above point $M_x$ to the point of intersection $S_x$ with this line; the stretch $S_x$—$M_x$ then indicates the height of the test point $M_x$.

The records thus obtained permit of deriving still another useful result. If the test points of equal heights of the various parallel division lines are joined with each other by a continuous line, as shown for the points of zero height in the Figs. 16 and 17, a relief chart of the foot similar to a topographic relief chart is obtained. The possibility of deriving this result is important in so far as the determination of the curves of equal heights, the areas enclosed by the same and thus the existence of foot portions having spread or are sagging permit the specialist to judge the foot as to its peculiar functional or pathological conditions.

Fig. 19 depicts a particularly characteristic relief chart of a foot. On this chart also cross profiles are added with a view to indicating all possible results obtainable from the test records; $c$ designates the incisions as made by the knives.

The height curve $d$ includes all the points that are situated zero millimeters apart from the floor, the respective incisions from the knives being of maximum lengths; the height curve $e$ interconnects all the points of a height of 3 millimeters; the height curve $f$ interconnects all the points of a height of 5 millimeters; the height curve $g$ interconnects all the points of a height of 9 millimeters; the height curve $h$ interconnects all the points of a height of 15 millimeters.

From this follows that with a device for making foot records according to the invention results can be derived in graphical manner, as hitherto unknown in the art.

It is obvious that the device according to the invention can be varied in respect of the details as described with reference to the constructional examples shown in the drawings without departing from the principle of the invention.

What I claim is:

1. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, and means for conjointly positively restoring said knives from their cutting positions into initial position together with said feeler pins.

2. In a device for the planar reproduction of surface formations of the soles of human feet, in combination, a supporting framework having a multiplicity of relatively axially vertically displaceable feeler pins slidably mounted therein for movement downward to variable extent depending on the contour of the foot imposed thereon, wedge-shaped flat knives, one knife arranged on each feeler pin remote from the feeler end thereof, a cutting edge on each of said knives extending parallel to the vertical path of movement of said feeler pins, a matrix table juxtaposed to said knives within the range of depression thereof and having spaced slots therein through which said knives are adapted to pass, said table adapted to receive a record sheet for receiving the recording cuts from said knives, and means for conjointly positively restoring said knives from their cutting positions into initial position together with said feeler pins.

3. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, means for conjointly positively restoring said knives from their cutting positions into initial position together with said feeler pins, a movable resetting element correlated to said restoring means and provided with a guide slot for each knife in registry therewith, and means for shifting said resetting element in the direction of restoring said knives, for causing the latter to share in said restoring movement by action of said guide slots.

4. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, an auxiliary contrivance correlated to the feeler ends of said feeler pins, for setting one and the same foot repeatedly into the same relative disposition to the complement of said feeler pins, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, and means for conjointly positively restoring said knives from their cutting positions into initial position together with said feeler pins.

5. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, two cutting edges on each knife to provide a shape of an equilateral rectangular triangle for said knife, a matrix table juxtaposed to said knives within the range of depression thereof and having spaced slots therein through which said knives are adapted to pass, said table adapted to receive a record sheet for receiving the recording cuts from said knives corresponding in their lengths to the depression carried out by the respective knife, and means for conjointly positively restoring said knives from their cutting positions into initial position together with said feeler pins.

6. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, a movable element operatively connected with said knives through the intermediary of said feeler pins and adapted to conjointly positively restore said two parts from their operative positions into initial position.

7. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, a movable element operatively connected with said knives through the intermediary of said feeler pins and adapted to conjointly positively restore said two parts from their operative positions into initial position, and means for retracting said movable element in the direction opposite to said restoring movement, for releasing said two parts with said knives resting against the stamping support to be punched.

8. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, a movable element operatively connected with said knives through the intermediary of said feeler pins, a reciprocable slide operatively connected with said movable element, and actuating means for said reciprocable slide, for conjointly positively restoring said knives together with said feeler pins from the operative positions of these two parts into initial position and for releasing said two parts with said knives resting against the stamping support to be punched.

9. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, a movable element operatively connected with said knives through the intermediary of said feeler pins, a reciprocable slide operatively connected with said movable element, and a swingable lid for covering said feeler ends of said pins operatively connected with said reciprocable slide adapting said lid through the intermediary of said slide for conjointly positively restoring said knives together with said feeler pins from the operative positions of these two parts into initial position, during the closing movement of said lid, and for releasing said two parts with said knives resting against the stamping support to be punched during the opening movement of said lid.

10. In a device for the planar reproduction of surface formations of the soles of human feet, in combination, a supporting framework having a multiplicity of relatively axially displaceable feeler pins slidably mounted therein for movement downward to variable extent depending on the contour of the foot imposed thereon, an angular stop member correlated to the feeler ends of said feeler pins, for setting one and the same foot repeatedly into the same relative disposition to the complement of said feeler pins, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives and means for conjointly positively restoring said knives from their cutting positions into initial position together with said feeler pins.

11. In a device for the planar reproduction of surface formations of the soles of human feet, in combination, a supporting framework having a multiplicity of relatively axially displaceable feeler pins, slidably mounted therein for movement downward to variable extent depending on the contour of the foot imposed thereon, an angular stop member correlated to the feeler ends of said feeler pins, for setting one and the same foot repeatedly into the same relative disposition to the complement of said feeler pins, a displaceable index arranged on each arm of said angular stop member, for ascertaining certain points of said foot by contacting with said points, wedge-shaped flat knives, one knife arranged on each feeler pin remote from the feeler end thereof, a matrix table juxtaposed to said knives within the range of depression thereof and having spaced slots therein through which said knives are adapted to pass, said table adapted to receive a record sheet for receiving the recording cuts from said knives, and means for conjointly positively restoring said knives from their cutting positions into initial position together with said feeler pins.

EUGEN MATTHIAS.